(12) United States Patent
Burlet (10) Patent No.: US 7,688,253 B2
(45) Date of Patent: Mar. 30, 2010

(54) METHOD AND PROCESSOR FOR REDUCED AMBIGUITY RESOLUTION MATRIX FOR INTERFEROMETRIC ANGLE DETERMINATION

(75) Inventor: Todd R. Burlet, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 60 days.

(21) Appl. No.: 12/170,251

(22) Filed: Jul. 9, 2008

(65) Prior Publication Data

US 2010/0007546 A1  Jan. 14, 2010

(51) Int. Cl.
*G01S 13/08* (2006.01)
*G01S 13/42* (2006.01)

(52) U.S. Cl. .................. 342/120; 342/127; 342/139; 342/146; 342/147; 342/156

(58) Field of Classification Search ............. 342/120, 342/121, 123, 127, 139, 140, 146, 147, 156, 342/195
See application file for complete search history.

(56) References Cited

U.S. PATENT DOCUMENTS

| | | | |
|---|---|---|---|
| 3,728,748 A | 4/1973 | Roehler | |
| 4,649,388 A | 3/1987 | Atlas | |
| 4,712,108 A | 12/1987 | Schwab | |
| 4,735,503 A | 4/1988 | Werner et al. | |
| 4,965,572 A | 10/1990 | Adamson | |
| 5,367,371 A | 11/1994 | Krawczyk | |
| 5,724,125 A | 3/1998 | Ames | |
| 5,796,471 A | 8/1998 | Wilkerson et al. | |
| 5,872,535 A | 2/1999 | Jordan et al. | |
| 5,999,129 A * | 12/1999 | Rose | 342/394 |
| 6,141,086 A | 10/2000 | Vahala et al. | |
| 6,184,819 B1 * | 2/2001 | Adomat et al. | 342/127 |
| 6,639,545 B1 * | 10/2003 | Hager et al. | 342/107 |
| 6,731,236 B1 | 5/2004 | Hager et al. | |
| 6,856,279 B2 * | 2/2005 | Hager et al. | 342/147 |
| 6,916,219 B2 | 7/2005 | Tokhtuev et al. | |
| 7,295,150 B2 * | 11/2007 | Burlet et al. | 342/120 |
| 7,311,000 B2 | 12/2007 | Smith et al. | |
| 7,417,586 B2 | 8/2008 | Thomas et al. | |
| 2002/0109630 A1 | 8/2002 | Law | |
| 2003/0210176 A1 | 11/2003 | Hager et al. | |
| 2003/0210177 A1 * | 11/2003 | Hager et al. | 342/147 |
| 2003/0214431 A1 * | 11/2003 | Hager et al. | 342/115 |
| 2005/0273257 A1 | 12/2005 | Hager et al. | |
| 2006/0220946 A1 * | 10/2006 | Nohmi | 342/107 |
| 2007/0222667 A1 * | 9/2007 | Burlet et al. | 342/120 |
| 2009/0224960 A1 * | 9/2009 | Ishii et al. | 342/104 |

* cited by examiner

*Primary Examiner*—John B Sotomayor
(74) *Attorney, Agent, or Firm*—Fogg & Powers LLC (57) ABSTRACT

A method and processor for resolving a processing radar return data to determine a mechanical angle to a target relative to a radar array having a right antenna, an ambiguous antenna, and a left antenna. An LA linear relationship determining, based upon a characteristic number of LA wraps relative to the mechanical angle. Likewise, determining a RA linear relationship determines a characteristic number of RA wraps and a RL linear relationship determines a characteristic number of RL wraps relative to the mechanical angle. All permutations of LA wraps, RA wraps, and RL wraps are listed, and for each permutation, a truth relationship is determined. A look up table is populated with permutations where the truth relationship is true.

10 Claims, 7 Drawing Sheets

FIG. 1
*(Prior Art)*

Figure 2:
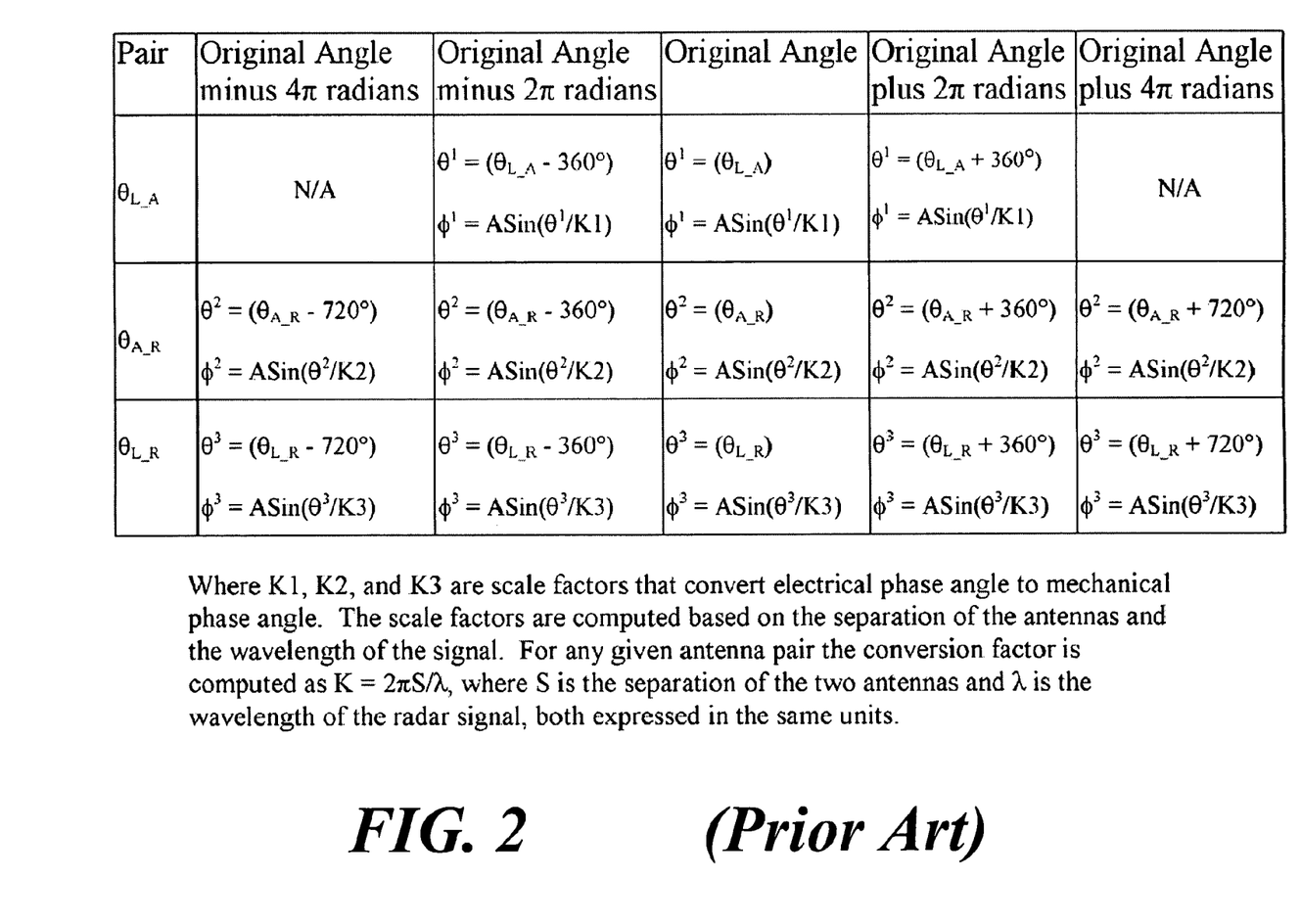
FIG. 2 is a prior art table showing a linear relationships between a mechanical angle relative to the radar array and the phase delay or electrical angles relative to each of the antennas.

| Pair | Original Angle minus 4π radians | Original Angle minus 2π radians | Original Angle | Original Angle plus 2π radians | Original Angle plus 4π radians |
|---|---|---|---|---|---|
| $\theta_{L\_A}$ | N/A | $\theta^1 = (\theta_{L\_A} - 360°)$<br>$\phi^1 = A\sin(\theta^1/K1)$ | $\theta^1 = (\theta_{L\_A})$<br>$\phi^1 = A\sin(\theta^1/K1)$ | $\theta^1 = (\theta_{L\_A} + 360°)$<br>$\phi^1 = A\sin(\theta^1/K1)$ | N/A |
| $\theta_{A\_R}$ | $\theta^2 = (\theta_{A\_R} - 720°)$<br>$\phi^2 = A\sin(\theta^2/K2)$ | $\theta^2 = (\theta_{A\_R} - 360°)$<br>$\phi^2 = A\sin(\theta^2/K2)$ | $\theta^2 = (\theta_{A\_R})$<br>$\phi^2 = A\sin(\theta^2/K2)$ | $\theta^2 = (\theta_{A\_R} + 360°)$<br>$\phi^2 = A\sin(\theta^2/K2)$ | $\theta^2 = (\theta_{A\_R} + 720°)$<br>$\phi^2 = A\sin(\theta^2/K2)$ |
| $\theta_{L\_R}$ | $\theta^3 = (\theta_{L\_R} - 720°)$<br>$\phi^3 = A\sin(\theta^3/K3)$ | $\theta^3 = (\theta_{L\_R} - 360°)$<br>$\phi^3 = A\sin(\theta^3/K3)$ | $\theta^3 = (\theta_{L\_R})$<br>$\phi^3 = A\sin(\theta^3/K3)$ | $\theta^3 = (\theta_{L\_R} + 360°)$<br>$\phi^3 = A\sin(\theta^3/K3)$ | $\theta^3 = (\theta_{L\_R} + 720°)$<br>$\phi^3 = A\sin(\theta^3/K3)$ |

Where K1, K2, and K3 are scale factors that convert electrical phase angle to mechanical phase angle. The scale factors are computed based on the separation of the antennas and the wavelength of the signal. For any given antenna pair the conversion factor is computed as $K = 2\pi S/\lambda$, where S is the separation of the two antennas and $\lambda$ is the wavelength of the radar signal, both expressed in the same units.

| combo # | Possible Combos - no noise | | |
|---|---|---|---|
| | | # of 2π wraps | |
| | LR | RA | LA |
| 1 | -2 | -2 | -1 |
| 2 | -2 | -1 | -1 |
| 3 | -2 | -1 | 0 |
| 4 | -1 | -1 | 0 |
| 5 | -1 | 0 | 0 |
| 6 | 0 | 1 | 0 |
| 7 | 1 | 2 | 0 |
| 8 | 2 | 1 | 0 |
| 9 | 2 | 1 | 1 |
| 10 | 2 | 2 | 1 |
| 11 | 2 | 2 | 1 |

| combo # | Possible Combos - typical noise | | |
|---|---|---|---|
| | | # of 2π wraps | |
| | LR | RA | LA |
| 1 | -2 | -2 | -1 |
| 2 | -1 | -2 | -1 |
| 3 | -2 | -1 | -1 |
| 4 | -1 | -1 | -1 |
| 5 | -2 | 0 | -1 |
| 6 | -1 | 0 | -1 |
| 7 | -2 | -2 | 0 |
| 8 | -1 | -2 | 0 |
| 9 | -2 | -1 | 0 |
| 10 | -1 | -1 | 0 |
| 11 | 0 | 0 | 0 |
| 12 | 0 | 0 | 0 |
| 13 | 0 | 0 | 0 |
| 14 | 1 | 1 | 0 |
| 15 | 0 | 0 | 0 |
| 16 | 1 | 1 | 0 |
| 17 | 2 | 1 | 0 |
| 18 | 1 | 2 | 0 |
| 19 | 2 | 2 | 0 |
| 20 | 1 | 0 | 1 |
| 21 | 2 | 0 | 1 |
| 22 | 1 | 1 | 1 |
| 23 | 2 | 1 | 1 |
| 24 | 1 | 2 | 1 |
| 25 | 2 | 2 | 1 |

METHOD AND PROCESSOR FOR REDUCED AMBIGUITY RESOLUTION MATRIX FOR INTERFEROMETRIC ANGLE DETERMINATION

STATEMENT REGARDING FEDERALLY SPONSERED RESEARCH OR DEVELOPMENT

This invention was made with Government support under Contract No. N00019-01-C-0033 awarded by the US Congress administered through Department PMA-280 of the US Navy. The Government has certain rights in this invention.

BACKGROUND OF THE INVENTION

Pulse radar altimeters demonstrate superior altitude accuracy due to their inherent leading edge return signal tracking capability. The pulse radar altimeter transmits a pulse of radio frequency (RF) energy, and a return echo is received and tracked using a tracking system.

Figure 1:
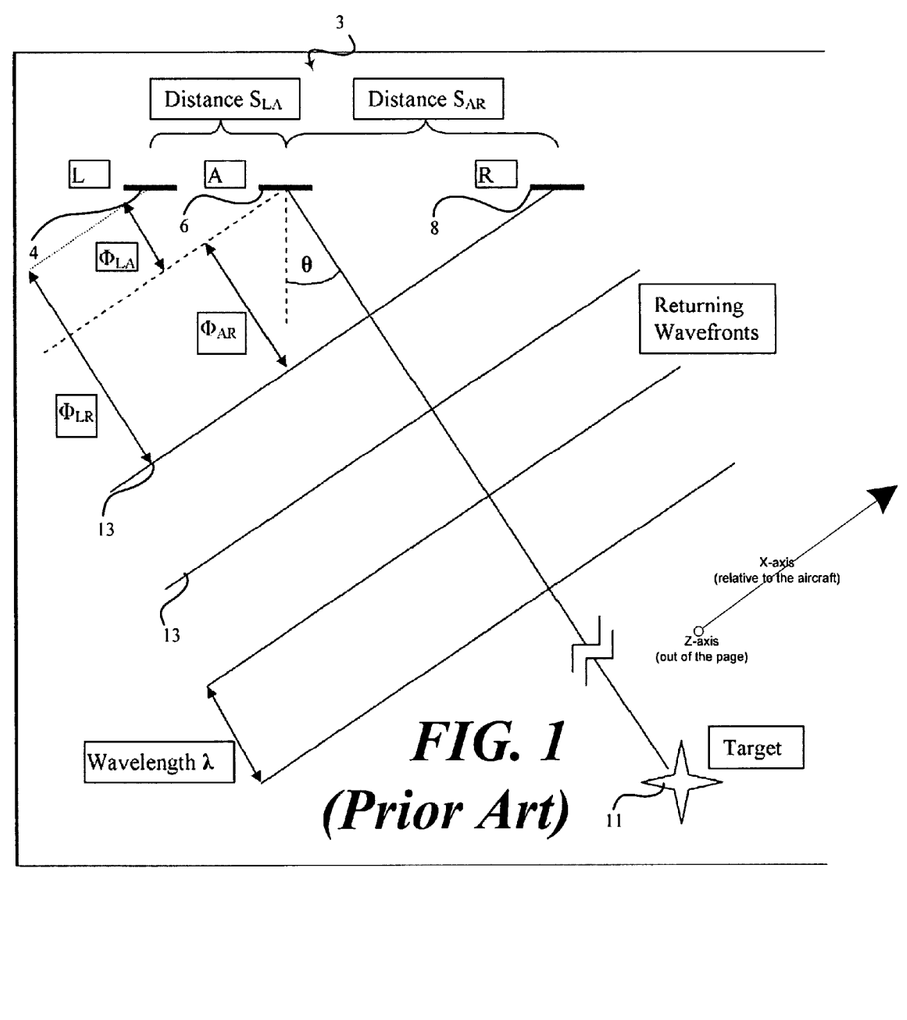
FIG. 1 is a prior art configuration of a three antenna radar array including a left antenna, an ambiguous antenna, and a right antenna.

In a typical pulsed radio altimeter application, one to two radar strip antennas are mounted side by side on the underside of an aircraft, with their long axes oriented along the X-axis of the vehicle. In an unambiguous interferometric altimeter system a third antenna, referred to as the ambiguity antenna, is added. Referring to FIG. 1, an ambiguous antenna 6 serves as the transmitter, and all three antennas 4, 6, and 8 serve as receivers. The radar system tracks the closest ground returns by closing a control loop on the leading edge of a reflected radar pulse 13 received by the ambiguous antenna 6. The two outer antennas 4, 8 are used, in conjunction with the ambiguous antenna, to determine the cross-track angle of the first ground return. Cross-track angle θ is the angle between the vertical axis in the aircraft body frame and the object being detected also referred to as the mechanical angle.

The three radar antennas, 4, 6, 8, are arranged side-by-side, with the center 6 antenna closer to the left antenna 4 than to the right antenna 8. While in this non-limiting embodiment, the center antenna 6 is closer to the left antenna 4 rather than the right antenna 8, but, in fact, the only requirement is that the spacing between the antennas is not equal. These antennas 4, 6, 8 represent the baseline of a triangulation system that measures the electrical phase angle φ for the reflected radar pulse 13 from a target 11 between each pair of antennas: left antenna 4 to ambiguous antenna 6 (also referred to as "L-A"), left antenna 4 to right antenna 8 ("L-R"), and center antenna 6 to right antenna 8 ("A-R"). The relationship between the measured electrical phase angle φ and the cross-track (or 'mechanical') angle θ of the return, as measured from the antenna centerline, is determined by the wavelength of the radar signal and the separation of the two antennas in each pair. For any given return each pair of antennas will detect a different phase angle, due to the differing separations of the antennas.

Along with the three antennas, three processing channels, referred to below as left, right and ambiguous respectively, each include a receiver, a data acquisition device, range gate, and a filter. Use of the three antenna system, along with the processing described herein, provides a solution to the ambiguous detected angle of the nearest object. The ambiguous detected angle is due to the spacing of the antennas being greater than the transmitted RF frequency wavelength. By receiving three returns, the processing system using a phase comparison process is able to determine an unambiguous location of the nearest object on the ground.

During the phase comparison portion of the time interval, the Doppler filters of the left, right and ambiguous channels are set to select a swath (shown in the nonlimiting exemplar depicted in FIG. 1 as ranging from a −40 to +40 degrees relative to a vertical) below aircraft. A phase processor compares the phase difference between R1 and RA, R2 and RA, and R1 and R2 (as set forth in U.S. Pat. No. 6,856,279, incorporated by this reference) once the return signals are received. As illustrated in FIG. 1, the exact range differences $\Phi_{LA}$, $\Phi_{RA}$, and $\Phi_{LR}$ are from phase differences and simple trigonometry relations are used to determine the exact crosstrack distance to the target 11 in aircraft body coordinates.

As illustrated in FIG. 1, after the range differences $\Phi_{LA}$, $\Phi_{RA}$, and $\Phi_{LR}$ are determined and knowing the antenna separations $S_{LA}$ and $S_{AR}$, and measured range R1, then the crosstrack distance (Y) and vertical distance (Z) can also be computed in aircraft body coordinates. It is important that the precise location of target 11 in each swath is determined so correlation can be made with the electronic maps which will accurately locate the aircraft on the electronic map. For example, at typical high speed aircraft cruising velocities, a radar, configured with reasonably sized Doppler filters, has swath widths of approximately 10 feet at 5000 feet altitude. The resulting incidence angle indicating the bearing of the target relative to a line normal to the surface of the center antenna 6 will then be on the order of less than 3 degrees. Basic trigonometry relations show that even with a typical error (for example 1%) on the radar range gate measured distance R1, (50 feet at 5000 feet altitude), knowing the precise antenna separation 50, and precise range differences $\Phi_{LA}$, $\Phi_{RA}$, and $\Phi_{LR}$, the crosstrack distance (Y) will be precise due to the very small incidence angle encountered.

Due to the geometry of the system it is possible for the electrical phase angle representing the phase difference between pairs of antennas to exceed 360 degrees, so that a radar return far from the antenna centerline may have the same electrical phase angle as a return that is nearer to the antenna centerline. This produces ambiguity when trying to determine mechanical angle when only electrical phase angle is known. For example, with a 1-foot separation between antennas L and R and a 4.3 GHz radar signal (wavelength=0.2291 feet), the electrical phase angle will increase from 0 to +180 degrees as the ground return moves from a mechanical angle of 0 degrees (straight below the aircraft) to an angle of 6.55 degrees. As the mechanical angle increases, the electrical phase angle will wrap back to 0 degrees at a mechanical angle of 13.1 degrees. Therefore, with a 2-antenna system it would be impossible to tell the difference between a ground return directly below the aircraft and a ground return 13.1 degrees to either side of the aircraft.

As the prior art process is currently executed, the solution of the probable location of the target requires a great deal of calculation. For each first spacing, for example $\Phi_{LA}$, the other two angles have to be checked requiring a calculation of $\Phi_{LR}$ and $\Phi_{AR}$ to check for convergence. As such, the calculation times are a function of the product of each of the possible solutions for each antenna separation. Processing time becomes extremely expensive, either in terms of performance or raw cost. The immense processing overhead the system portrayed in FIG. 1 generates is demonstrated by selection of real numbers.

In a non-limiting example depicted in FIG. 2, the L-A antenna separation is taken to be 4 inches, and the A-R antenna separation is taken to be 8 inches, then the L-R antenna separation is the sum of the distances, 12 inches. Assuming an exemplary RF frequency of 4.3 GHz, and an antenna beamwidth of 80 degrees, in order to unambiguously determine the mechanical angle of the ground return over the range −40 to +40 degrees, the 13 elements result in 75 possible combinations of electrical phase wraps, when we take one element from each of the 3 rows. The mechanical angle ranges over approximately 80 degrees. Because electrical angles are really phase measurements relative to the RF frequency, phase can wrap through a number of complete cycles such that triangulation may be based upon on angle $\theta'$ which is equal to either the original $\theta$ or the original $\theta$ plus or minus a integral multiple of 360 degrees.

A well known relationship exists to generate the possible locations at which the electrical angle $\phi$ to the mechanical angle $\theta$. FIG. 2 shows the generation of all possible combinations relating the mechanical angles $\theta$ to the electrical angles $\phi$. (Numeric superscripts are used not to denote squares and cubes but rather variable names such that $\theta^3$ expresses the third possible value for $\theta$ and not the value $\theta$ raised to the third power). The combinatorial mathematics shows that seventy five possible combinations exist as to the combinations of mechanical and electrical angles resulting from the exemplary dimensions of the model shown in FIG. 1.

Processors according to the prior art perform a brute-force search of all 75 possible combinations in order to find the correct solution. First, the mechanical angle for all 13 elements of exemplary array of three antennas is computed. Then, each of the 75 possible combinations of antenna pairs (one element from each of the 3 rows in FIG. 2) is considered. The variance of the three selected mechanical angles is computed for each of the 75 combinations. The combination that has the lowest computed variance is taken to be the correct solution. Finally, the weighted average of the three computed mechanical angle values is computed. In this way the mechanical phase angle is determined from the electrical phase angles unambiguously.

What is needed in the art is a processor and a method for removing those of the solutions that are inherently nonconvergent so as to remove the inherent overhead of performing those calculations and checking their meaning against the situation in order to lighten the processing burden.

SUMMARY OF THE INVENTION

A method and processor for resolving radar return data to determine a mechanical angle to a target relative to a radar array having a right antenna, an ambiguous antenna, and left antenna. An LA linear relationship determining, based upon, a characteristic number of LA wraps relative to the mechanical angle. Likewise, determining, a RA linear relationship determines a characteristic number of RA wraps and a RL linear relationship determines a characteristic number of RL wraps relative to the mechanical angle. All permutations of LA wraps, RA wraps, and RL wraps are listed and for each permutation, a truth relationship is determined. A look up table is populated with permutations where the truth relationship is true. In an alternate embodiment, a series of Boolean logical expressions are formulated to reflect the instances where the truth relationship is true. Every reference herein to look up table applies with equal vigor to this alternate embodiment.

The present invention comprises a system for populating the look-up table to reduce the processing overload.

BRIEF DESCRIPTION OF THE DRAWINGS

Preferred and alternative embodiments of the present invention are described in detail below with reference to the following drawings:

FIG. 5 is a look-up table showing the truth relationship between permutations of phase wrap and mechanical angles;

DETAILED DESCRIPTION OF THE INVENTION

A processor and method for reducing the processing overhead resulting from receiving returns from an array of three radar strip antennas includes populating an Ambiguity Resolution Matrix (ARM). The purpose of the ARM is to reduce the processing of returns to only those with the measured electrical phases, along with the possible 'wrapped' electrical phases that are multiples of +/−360 degrees of the measured electrical phases, to meaningful solutions ignoring those that would be meaningful in light of the known dimensions of the three antenna array. By forming all the possible combinations of these electrical phases and the mechanical phases that would have produced these electrical phases, it is possible to unambiguously identify the one mechanical phase angle that would have produced the observed electrical phase angles.

Figure 3:
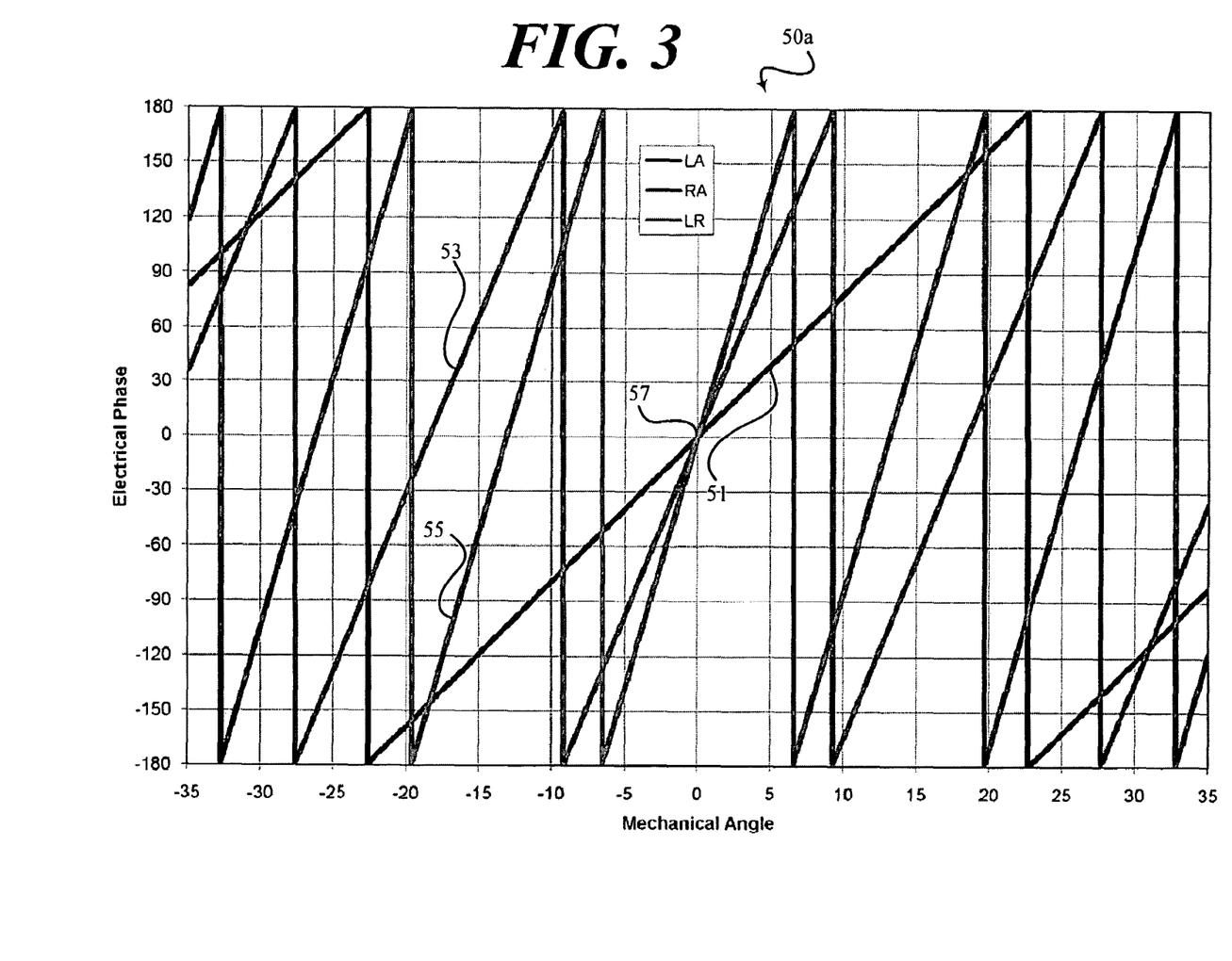
FIG. 3 is a graphic depiction of linear relations between electrical angles and mechanical angles.

As is indicated in FIG. 3, a graphic representation 50a depicts the fact that conversion from electrical to mechanical angles is based upon a simple linear relationship that stems from the physical dimensions of the antenna array. The equation is simple and linear:

$$K = 2\pi \frac{S}{\lambda}$$

where S is the separation between the two antennas and $\lambda$ is the wavelength of the radar signal. The linear relationship produces a graph as shown in FIG. 3 for each of the three pairs of antennas formable in the group of three antennas. Each antenna pair results in a line whose slope is proportioned to the separation distance of the antenna pair. The line for the first pair being the closest to each other from the non-limiting example shown in FIG. 1 is the ambiguous and left antennas and, therefore, the line for them is 51, having the shallowest slope of the three. Line 53 represents the relation between electrical and mechanical angles for the next closest pair, the right and the ambiguous antennas. Finally, line 55 represents the relationship between the two most distant antennas in the set, the left and right antennas. Because a target placed on the vertical axis of the aircraft would be displaced by a zero degree angle, all three lines 51, 53, and 55 intersect at a point 57 located at the intersection of the zero mechanical and zero electrical angles.

Figure 4:
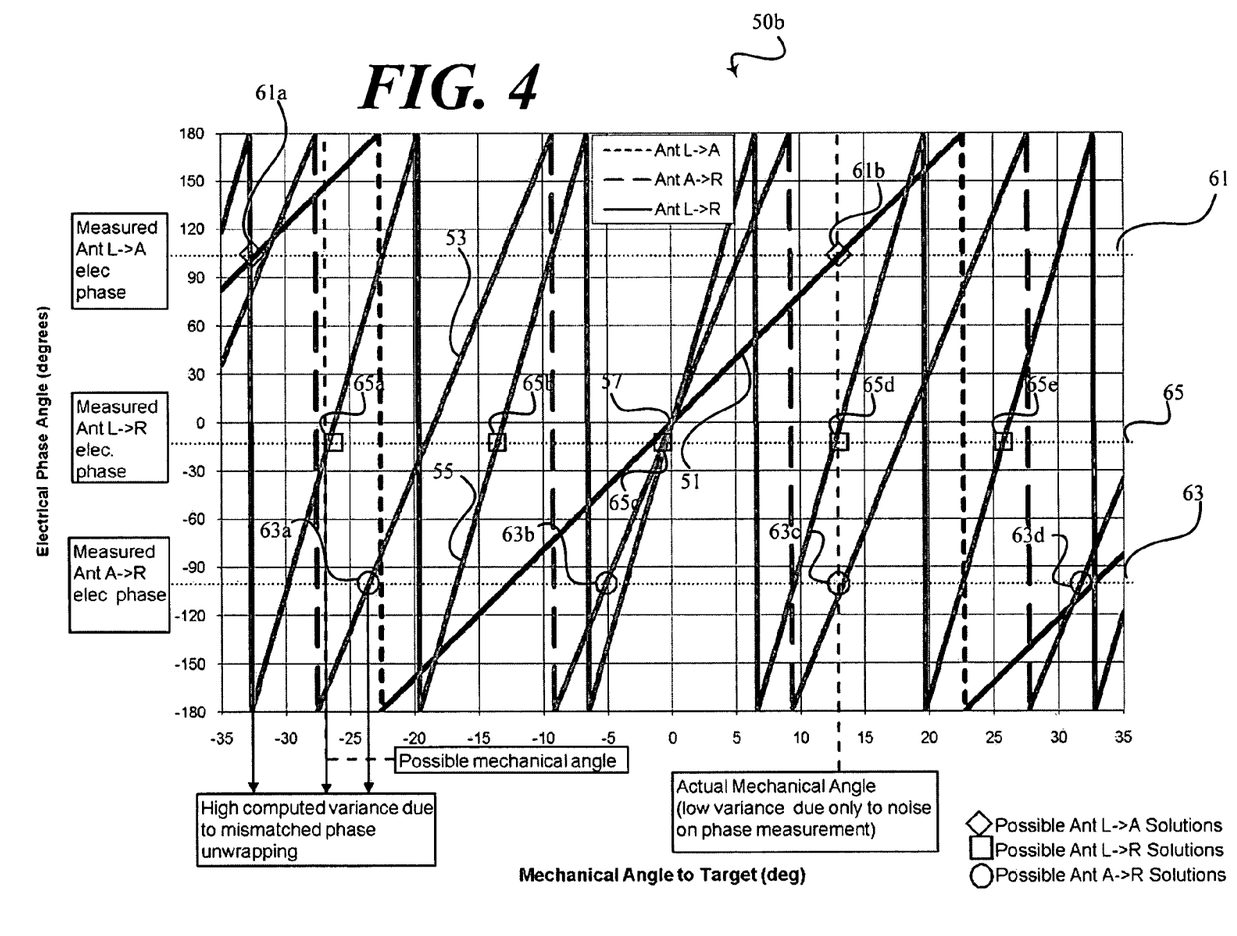
FIG. 4 is a resolution of a particular mechanical angle based upon the graphic depiction of linear relations between electrical angles and mechanical angles.

FIG. 4 shows a graphic representation 50b of the method of solution for an acceptable mechanical angular relationship.

Phase relationships between antennas pairs are measured and recorded as vertical lines such that the phase relationship between the left and the ambiguous antennas is recorded to be an electrical angle ϕ of 105 degrees shown as a line 61. The phase relationship between the right and ambiguous antennas is noted to be −100 degrees and noted by a line 63. Finally, the furthest separated pair, the left and right antennas show an electrical angle representing a phase difference of about −12 degrees and shown by a line 65.

To solve for a mechanical angle, the intersections of the linear scale factor solution and the observed phase difference for the same pair of antennas is noted. Thus, for the left and ambiguous pair of antennas, the solutions are twofold: intersection 61*a* and 61*b*. For the right ambiguous pair, the intersection points are fourfold: 63*a*, 63*b*, 63*c*, and 63*d*. Finally, for the furthest separated pair, the left and right antennas, in this non-limiting example, the solutions are found at points 65*a*, 65*b*, 65*c*, 65*d*, and 65*e*.

To evaluate the solution sets, groupings of resulting mechanical angles must be evaluated. Because 61*b*, 63*c*, and 65*d* converge on a solution of a thirteen degree mechanical angle (there being a very low variance between the three solutions), the thirteen degree mechanical angle is chosen as a solution. Another solution candidate is shown in the region between −33 and −23 degrees of mechanical angle where the solutions 61*a*, 63*a*, and 65*a* poorly converge. Because of the high computed variance, this result is rejected as exceeding even a "noisy" solution.

This invention reduces the number of combinations that must be computed by only computing the combinations of elements that are physically realizable. Considering again the nonlimiting exemplary graphic representation 50*a* (FIG. 3), we see that some of the combinations of phase values are not physically realizable, since such a solution would require the ground return to be reflected from 3 different places at once. By not computing such physically unrealizable combinations of phase wraps the number of computed combinations can be reduced from 75 to as few as 11.

After consideration of the range of mechanical angles discernable (earlier stated as between −40 and +40 as a constraint on the system); and since 50*a* indicates that, given the parameters of the non-limiting exemplary design, only ranges from −2 to +2 360 degree wraps will fit within the designated mechanical angles for lines 53 and 55; and since FIG. 3 also indicates that the closest antenna pair, the left and center antennas in the non-limiting example, will allow only a single wrap in either direction; there are seventy five combinations of wraps possible to generate any solution; i.e., five (−2, −1, 0, 1, 2) times five (−2, −1, 0, 1, 2), times three (−1, 0, 1). A chart 70 such as that of FIG. 5 is then possible.

Referring to the chart 70 in FIG. 5, a first column 75 cyclically repeats the possible number of wraps associated with the furthest of the antennas pairs, that of the left and right antennas, thereby populating all of the seventy-five rows possible. In a second column 73, representing the antenna pair of the right and ambiguous antennas, five instances of each of the five possible states is repeated in three series. Finally, in the third column, representing the antennas pair with the smallest separation, the left and ambiguous antennas, twenty five instances of each of the three possible wrap states (−1, 0, 1) are set forth such that all of the seventy five unique combinations of wrap states are represented among the three columns 71, 73, and 75.

Moving then to column 81, mathematical elimination is used to remove meaningless wrap states. In a zero-noise environment, only 11 possible combinations of phase wraps are possible for this nonlimiting exemplary geometry. Populating the table with green cells results in "YES" cells at locations 91*a-k*. These cells represent the places on the chart 70 where the solutions converge within a selected small tolerance suitably selected to represent a non-noisy environment. These results are compiled into a single table 91 depicted in FIG. 6*a*.

Figure 6A:
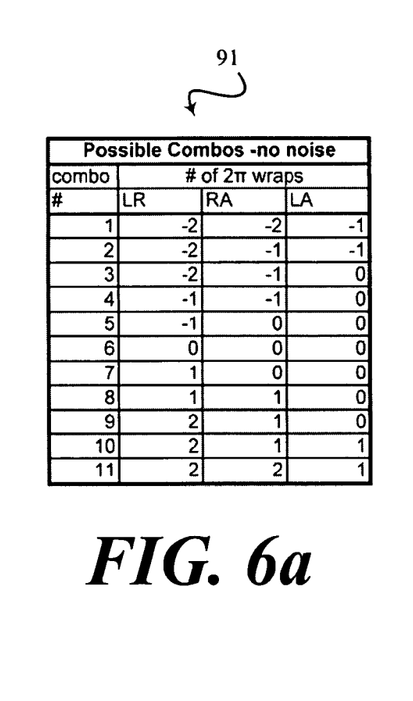
FIG. 6a is a no-noise truth table showing the true permutations.
Figure 6B:
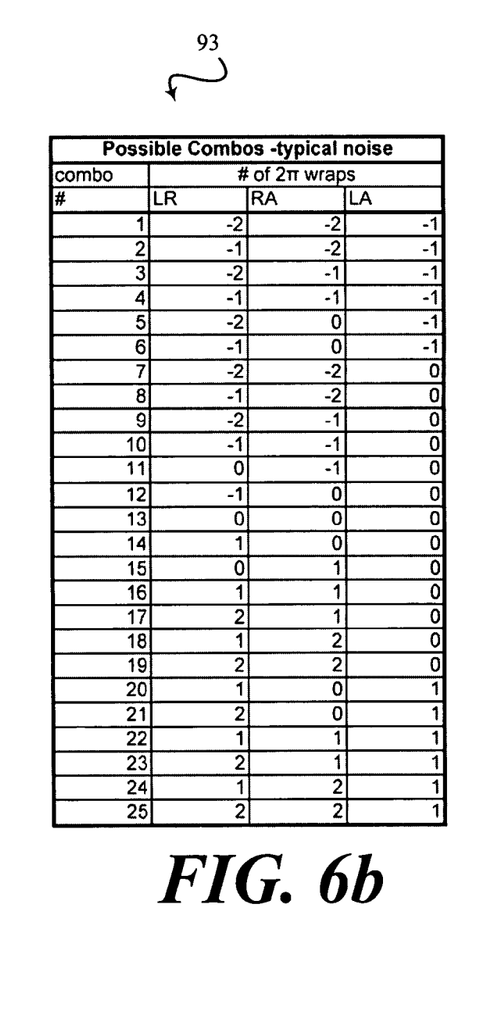
FIG. 6b is a truth table using solutions including a radius of noise.

Returning to FIG. 5, in any real-world application, there will be noise that tends to affect the phase measurements. The presence of noise results in a smearing of electrical phases for any given mechanical angle. The presence of the smearing means that for resolution of any mechanical angle, consideration of phase values near rather than at the allowed phase wraps must be included in a mechanical angle solution. In practice, a tolerance or radius for these noisy electrical phase values would be designated based on the system design. To that end, a second column is populated where convergence occurs within the broader tolerance or radius known as a noise tolerance and is shown by "YES" cells at locations 93*a-w*, in the 'Yes with noise' column 83 of the chart 70. These datum are collected in a table 93 shown in FIG. 6*b*. Finally, returning to FIG. 5, experimental data is shown in the 'observed' column. In this example data we observe that real world data falls into only 12 of the 75 possible phase wrap combinations. 10 of these combinations are unconditionally allowed, and 2 are allowed based on the noise tolerance that was established for this experiment resulting in "YES" cells at locations 95*a-k*. In such a manner, only those solutions shown in either of the FIGS. 6*a* and 6*b* are suitably selected based upon noise levels in the environment and only those solutions are sought, greatly lessening the processing overhead.

Figure 7:
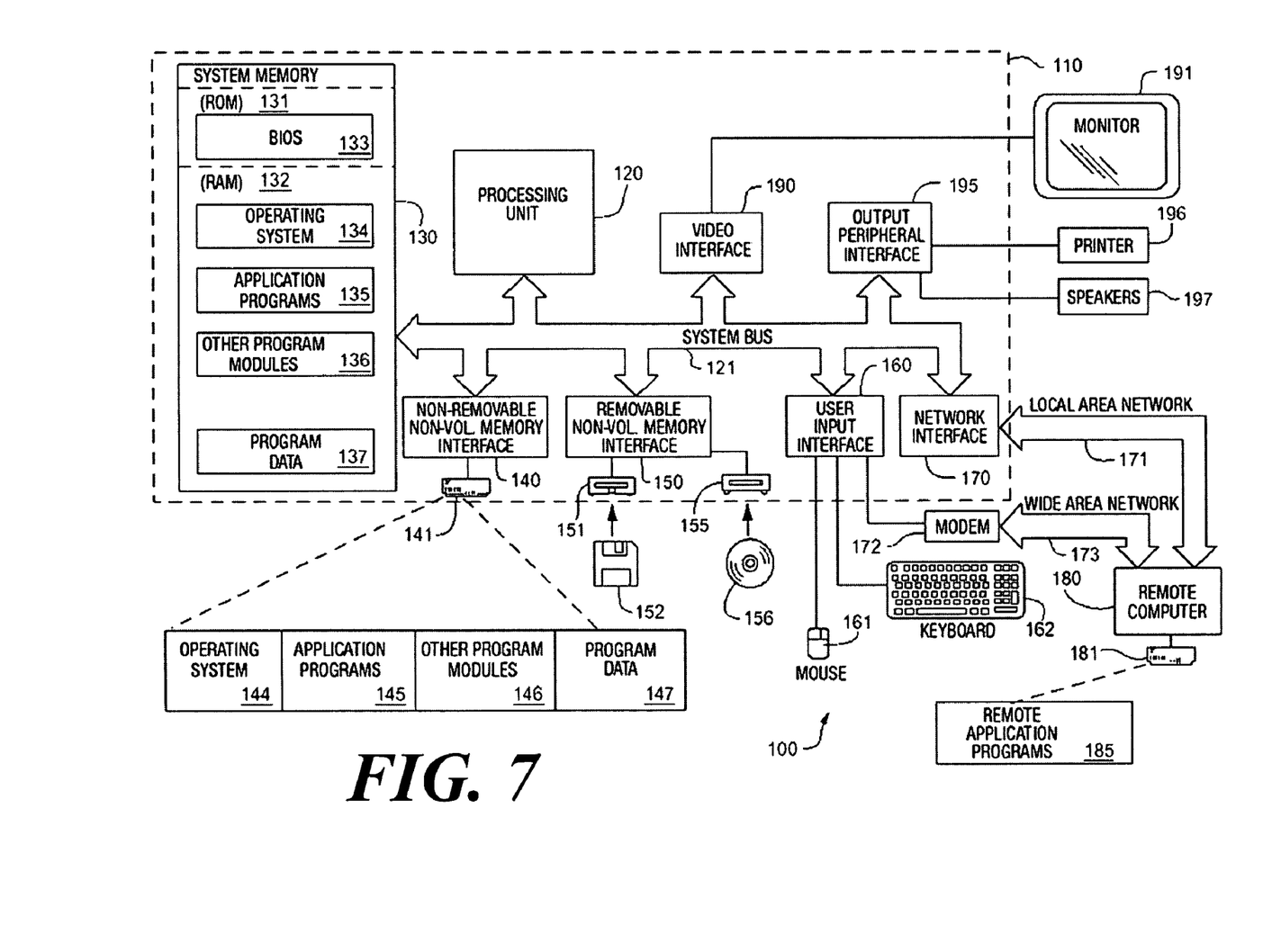
FIG. 7 is a diagram of a non-limiting exemplary processor.

FIG. 7 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, or configurations that may be suitable for use with the invention include, but are not limited to: personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 7, an exemplary system for implementing the invention, includes a general purpose computing device in the form of a computer 110. Components of computer 110 may include, but are not limited to, a processing unit 120, a system memory 130, and a system bus 121 that couples various system components, including the system memory, to the processing unit 120. The system bus 121 may be any of several types of bus structures including a memory bus or memory controller, a peripheral bus, and a local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnect (PCI) bus, also known as the Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

While the preferred embodiment of the invention has been illustrated and described, as noted above, many changes can be made without departing from the spirit and scope of the invention. For example, far fewer components are necessary to provide a processor capable of resolving mechanical angle than have been set forth in the exemplary computer 100 shown in FIG. 7. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for resolving a processing radar return data to determine a mechanical angle to a target relative to a radar array having a right antenna, an ambiguous antenna, and left antenna, the left antenna being separated from the ambiguous antenna by an LA separation, the right antenna being separated from the ambiguous antenna by an RA separation, and the right antenna being separated from the left antenna by an RL separation, the radar return data including an LA phase difference between radar return data received at an ambiguous radar channel and a left radar channel, an RA phase difference between radar return data received at a right radar channel and an ambiguous radar channel, and a RL phase difference between radar return data received at a right radar channel and a left radar channel, the method comprising:
   determining, based upon a LA linear relationship, a characteristic number of LA wraps relative to the mechanical angle;
   determining, based upon a RA linear relationship, a characteristic number of RA wraps relative to the mechanical angle;
   determining, based upon a RL linear relationship, a characteristic number of RL wraps relative to the mechanical angle;
   listing all permutations of LA wraps, RA wraps, and RL wraps;
   determining, for each permutation, a truth relationship for each permutation; and
   populating a look up table with permutations where the truth relationship is true.

2. The method of claim 1, wherein:
   determining, for each permutation, a truth relationship for each permutation includes determining a truth relationship based upon a determined noise radius.

3. The method of claim 1, further comprising:
   calculating radar ranging solutions based upon the look-up table.

4. The method of claim 1 wherein:
   determining an LA linear relationship between the mechanical angle and the LA phase difference based respectively upon the LA separation includes determining, based upon a LA linear relationship, a characteristic number of LA wraps relative to the mechanical angle;
   determining an RA linear relationship between the mechanical angle and the RA separation, that determining being based upon a RA linear relationship, a characteristic number of RA wraps relative to the mechanical angle; and
   determining an RL linear relationship between the mechanical angle and the RL separation, that determining being based upon a RL linear relationship, a characteristic number of RL wraps relative to the mechanical angle.

5. A look-up table stored in a computer readable medium, the look-up table being populated with data, the data including:
   only those permutations of electrical angles where phase angles agree within a noise radius;
   the noise radius being determined based upon a linear relationship between electrical angle between a first and a second antenna and a mechanical angle relative to the first and second antenna.

6. The look-up table, wherein the linear relationship includes:
   an LA linear relationship between the mechanical angle and an LA phase difference based respectively upon an LA separation including determining, based upon a LA linear relationship, a characteristic number of LA wraps relative to the mechanical angle;
   an RA linear relationship between the mechanical angle and the RA separation that determining being based upon a RA linear relationship, a characteristic number of RA wraps relative to the mechanical angle; and
   an RL linear relationship between the mechanical angle and the RL separation that determines being based upon a RL linear relationship, a characteristic number of RL wraps relative to the mechanical angle.

7. A processor for resolving radar return data to determine a mechanical angle to a target relative to a radar array having a right antenna, an ambiguous antenna, and left antenna, the left antenna being separated from the ambiguous antenna by an LA separation, the right antenna being separated from the ambiguous antenna by an RA separation, and the right antenna being separated from the left antenna by an RL separation, the radar return data including an LA phase difference between radar return data received at an ambiguous radar channel and a left radar channel, an RA phase difference between radar return data received at a right radar channel and an ambiguous radar channel, and a RL phase difference between radar return data received at a right radar channel and a left radar channel, the method comprising:
   a system bus for receiving an LA electrical angle, an RA electrical angle, and an LR electrical angle;
   a processing unit for resolving a mechanical angle based upon the LA electrical angle, the RA electrical angle, and the LR electrical angle; and
   a look-up table which the processing unit accesses for determining at least one permutation of the LA electrical angle, the RA electrical angle, and the LR electrical angles the processing unit will process to resolve the mechanical angle.

8. The processor of claim 7, wherein the at least one permutation includes:
   the LA electrical angle, including a first LA electrical angle and at least one second LA electrical angle, the second LA electrical angle being the sum of the first LA electrical angle and an integral multiple of 360 degrees;
   the RA electrical angle, including a first RA electrical angle and at least one second RA electrical angle, the second RA electrical angle being the sum of the first RA electrical angle and an integral multiple of 360 degrees; and
   the LR electrical angle, including a first LR electrical angle and at least one second LR electrical angle, the second LR electrical angle being the sum of the first LA electrical angle and an integral multiple of 360 degrees.

9. The processor of claim 8, wherein the permutations are selected based upon:
   an LA linear relationship between the mechanical angle and an LA electrical angle;
   an LR linear relationship between the mechanical angle and an LR electrical angle; and
   an RA linear relationship between the mechanical angle and an RA electrical angle.

10. The processor of claim 9, wherein the permutations are further selected based upon a determined noise radius.

* * * * *